(12) United States Patent
Hosseinimakarem (10) Patent No.: US 11,668,604 B2
(45) Date of Patent: Jun. 6, 2023

(54) STACKED POLARIZER IMAGING

(71) Applicant: Micron Technology, Inc., Boise, ID (US)

(72) Inventor: Zahra Hosseinimakarem, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 347 days.

(21) Appl. No.: 17/021,064

(22) Filed: Sep. 15, 2020

(65) Prior Publication Data

US 2022/0082441 A1 Mar. 17, 2022

(51) Int. Cl.
*G01J 4/04* (2006.01)
*G02B 5/30* (2006.01)

(52) U.S. Cl.
CPC .............. *G01J 4/04* (2013.01); *G02B 5/3041* (2013.01); *G02B 5/3058* (2013.01)

(58) Field of Classification Search
CPC ....................................................... G01J 4/04
See application file for complete search history.

(56) References Cited

U.S. PATENT DOCUMENTS

| | | |
|---|---|---|
| 2009/0179143 A1 | 7/2009 | Murooka et al. |
| 2010/0045847 A1 | 2/2010 | Ryu |
| 2016/0345888 A1* | 12/2016 | Wu .................... A61B 5/0075 |
| 2018/0205928 A1 | 7/2018 | Conway, Sr. et al. |
| 2019/0170925 A1* | 6/2019 | Nichol ................. G02B 6/0076 |
| 2020/0013819 A1 | 1/2020 | Toda |
| 2020/0243735 A1 | 7/2020 | Lee et al. |
| 2020/0251049 A1 | 8/2020 | Morris et al. |
| 2020/0251460 A1 | 8/2020 | Iguchi |
| 2020/0258869 A1 | 8/2020 | Wu et al. |
| 2020/0271932 A1 | 8/2020 | Tuomisto et al. |
| 2020/0279881 A1 | 9/2020 | Jin et al. |
| 2021/0084284 A1* | 3/2021 | McEldowney ........ H04N 23/55 |

FOREIGN PATENT DOCUMENTS

KR 10-2010-0023211 A 3/2010

OTHER PUBLICATIONS

International Search Report and Written Opinion from related international application No. PCT/US2021/050191, dated Dec. 28, 2021, 9 pages.

* cited by examiner

*Primary Examiner* — Sang V Nguyen
(74) *Attorney, Agent, or Firm* — Brooks, Cameron & Huebsch, PLLC (57) ABSTRACT

Embodiments of the present disclosure include apparatuses and method for stacked polarizer imaging. In a number of embodiments, a method can include activating a first polarization layer of a plurality of polarization layers, detecting a first image with an array of pixels from a light source input that is polarized when passed through the first polarization layer, and determining, via a controller coupled to the array of pixels, whether a quality of the first image that was polarized by the first polarization layer meets a threshold. A stacked polarizer can include a plurality of polarizers that are stacked upon each other such that a light source input can be passed through the stack of polarizers and be detected by a pixel of an image sensor cell. Each of the polarizers in the stack of polarizers can be individually activated and deactivated.

19 Claims, 5 Drawing Sheets

STACKED POLARIZER IMAGING

TECHNICAL FIELD

The present disclosure relates generally to apparatuses, non-transitory machine-readable media, and methods for stacked polarizer imaging.

BACKGROUND

Images can be captured by an imaging system that can include light capturing devices such as lenses and the imaging system converts the light to electrical signals that is stored and viewed on computing devices as an image. A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can include sensors, such as an image sensor, to capture image data and a display used to view images and/or text. The display can be a touchscreen display that serves as an input device. When a touchscreen display is touched by a finger, digital pen (e.g., stylus), or other input mechanism, associated data can be received by the computing device.

DETAILED DESCRIPTION

Embodiments of the present disclosure include apparatuses and methods for stacked polarizer imaging. In a number of embodiments, a method can include activating a first polarization layer of a plurality of polarization layers, detecting a first image with an array of pixels from a light source input that is polarized when passed through the first polarization layer, and determining, via a controller coupled to the array of pixels, whether a quality of the first image that was polarized by the first polarization layer meets a threshold. A stacked polarizer can include a plurality of polarizers that are stacked upon each other such that a light source input can be pass through the stack of polarizers and be detected by a pixel of an image sensor cell. Each of the polarizers in the stack of polarizers can be individually activated and deactivated. For example, in an array of image sensor cells a first polarizer of each image sensor cell can be activated and the other polarizers can be deactivated such that a light source input can pass through the stack of polarizers and be polarized by the first polarizer and image sensor cells can capture an image that is polarized with the first polarizer. This process can continue by activating a second polarizer of each image sensor cell and deactivating the other polarizers, such that an image that is polarized with the second polarizer can be captured.

A stacked polarizer can be used to capture images with different polarizations, while not increasing the footprint of an image sensor. The stacked polarizer can be positioned in front of a pixel of an image sensor cell and have a footprint that is no larger than the pixel.

As used herein, designators such as "N," "M," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 120 can reference element "20" in FIG. 1, and a similar element can be referenced as 220 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
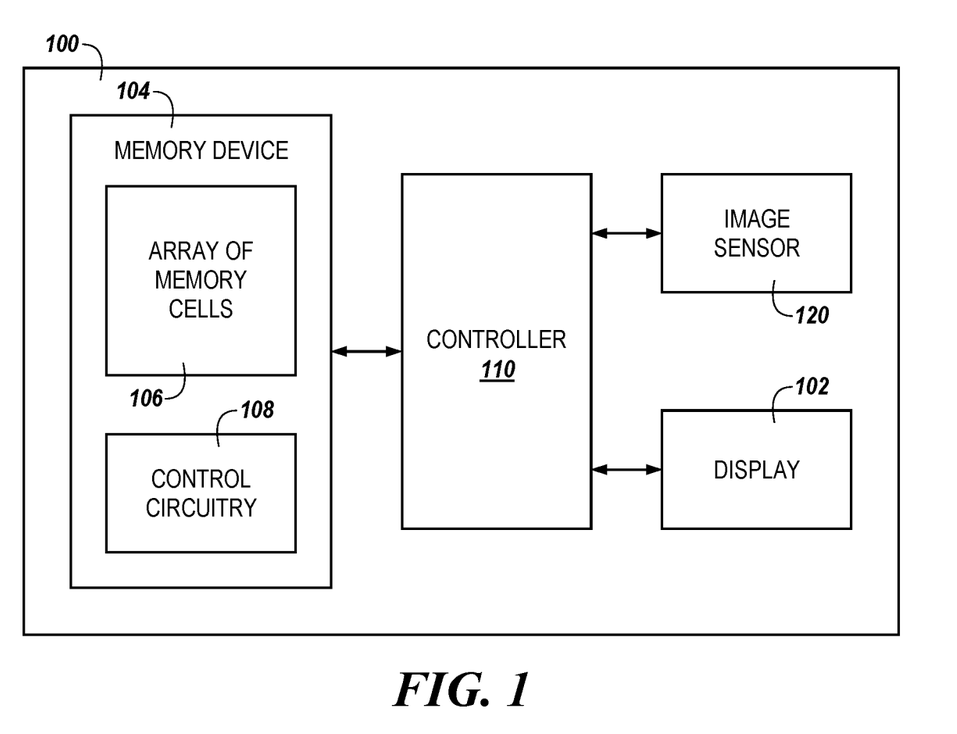
FIG. 1 is a functional block diagram in the form of an apparatus having a display, an image sensor, a memory device, and a controller in accordance with a number of embodiments of the present disclosure.

FIG. 1 is a functional block diagram in the form of a computing system including an apparatus 100 having a display 102, an image sensor 120, a memory device 104, and a controller 110 (e.g., a processor, control circuitry, hardware, firmware, and/or software) in accordance with a number of embodiments of the present disclosure. The memory device 104, in some embodiments, can include a non-transitory machine readable medium (MRM) configured to store instructions that can be executed by controller 110 to perform embodiments of the present disclosure.

The apparatus 100 can be a computing device and, for instance, the display 102 may be a touchscreen display of a mobile device such as a smartphone. The controller 110 can be communicatively coupled to the memory device 104, image sensor 120, and/or the display 102. As used herein, "communicatively coupled" can include coupled via various wired and/or wireless connections between devices such that data can be transferred in various directions between the devices. The coupling need not be a direct connection, and in some examples, can be an indirect connection.

The memory device 104 can include non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random access memory (SRAM), among others. Memory device 104 can include an array of memory cells 106 configured to store bits of data and control circuitry 108 configured to perform operations on the memory device 104 (e.g., read, write, erase bits of data in the array of memory cells 106).

Apparatus 100 can include an image sensor 120. For example, image sensor 120 can be part of a camera of a mobile device. The image sensor 120 can generate images (video, text, etc.) which can be visible on the display 102. Image sensor 120 can include a stack polarizer that includes a number of polarizers that can be used individually or in combination to polarize a light source input for the image sensor to capture polarized image data. Additionally, the image sensor 120 can capture and/or receive input from objects, people, items, etc. and transmit that input to the controller 110 to be analyzed. In some examples, the images sensor 120 can be part of a camera and can provide input to the controller 110, such as facial recognition input. For example, the display 102 can be a portion of a mobile device including a camera (e.g., a smartphone).

Figure 2:
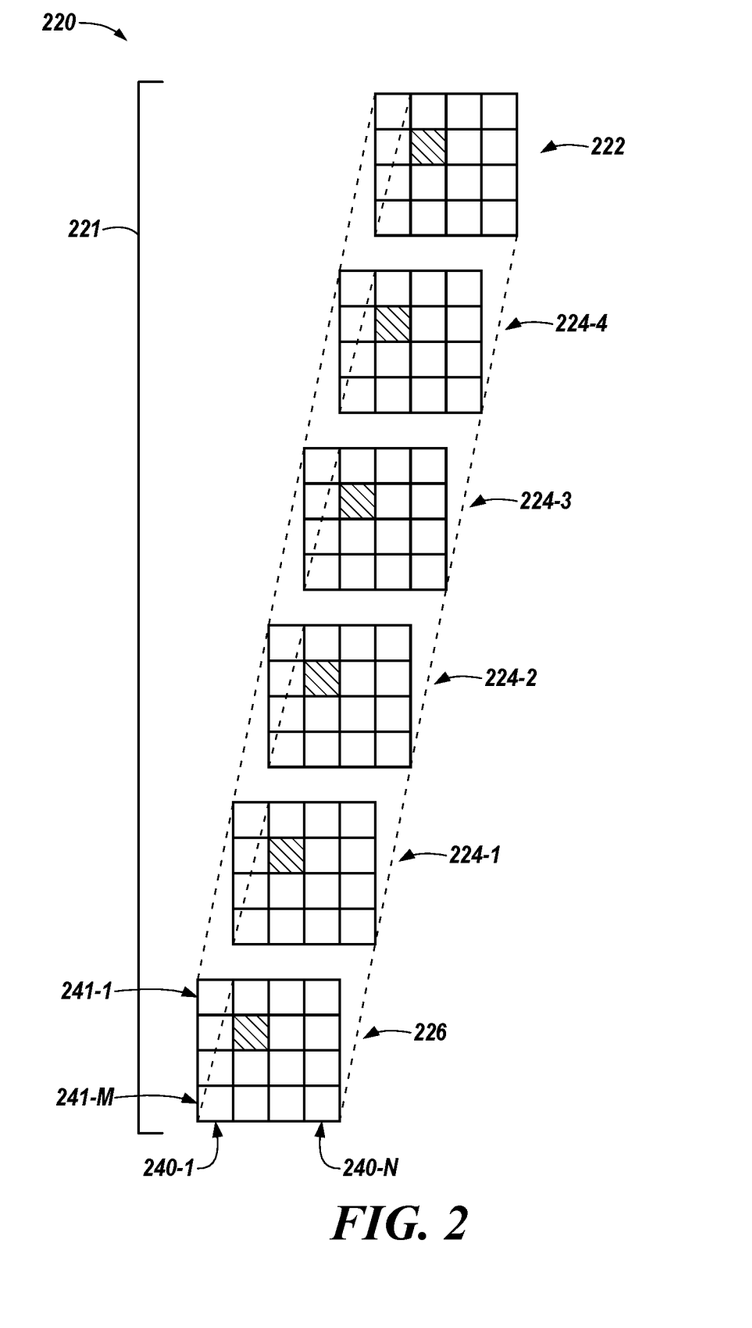
FIG. 2 is a functional block diagram of an image sensor including an array of image sensor cells in accordance with a number of embodiments of the present disclosure.

FIG. 2 is a functional block diagram of an image sensor 220 including an array of image sensor cells 221 in accordance with a number of embodiments of the present disclosure. The array of image sensor cells 221 can include a portion including an array of lenses 222 (e.g., lens layer), stacked polarizers comprising a portion including an array of first polarizers 224-1 (e.g., first polarization layer), a portion including an array of second polarizers 224-2 (e.g., second polarization layer), a portion including an array of third polarizers 224-3 (e.g., third polarization layer), a portion including an array of fourth polarizers 224-4 (e.g., fourth polarization layer), and a portion including an array of pixels 226 (e.g., pixel layer). The polarization layers can be comprised of wire polarizers. Each array of lenses, first polarizers, second polarizers, third polarizer, fourth polarizers, and pixels can include a number of rows 141-1, . . . , 141-M and a number of columns 140-1, . . . , 140-N, where the array of image sensor cells 221 includes N×M image sensor cells. For example, each image sensor cell of the array of image sensor cells 221 includes a lens, a first polarizer, a second polarizer, a third polarizer, a fourth polarizer, and a pixel. As shown in FIG. 2, an image sensor cell at the intersection of column 2 and row 2 is shaded and includes a lens, a first polarizer, a second polarizer, a third polarizer, a fourth polarizer, and a pixel.

In a number of embodiments, the array of first, second, third, and fourth polarizer layers can each include a plurality (e.g., N×M) of polarizers that are associated with image sensor cells, such that each image sensor cell can include a first polarizer, a second polarizer, a third polarizer, and a fourth polarizer that can each be individually activated and deactivated.

The array of pixels can be configured to capture image data in a red green blue (RBG) format. For example, every other pixel in each row can be configured to capture green image data and alternating rows can be configured to capture red image data and blue image data between the pixels configured to capture green image data. The red image data, blue image data, and green image data can be the image data (e.g., a number of bits of data) to represent an image in RGB format.

Figure 3:
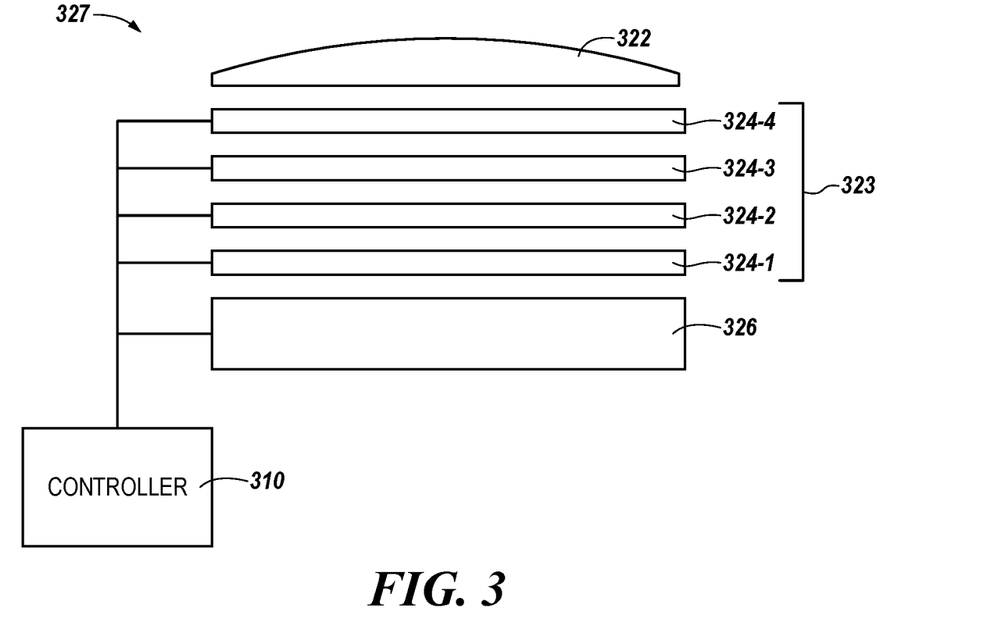
FIG. 3 is a functional block diagram of an image sensor cell in accordance with a number of embodiments of the present disclosure.

FIG. 3 is a functional block diagram of an image sensor cell 327 in accordance with a number of embodiments of the present disclosure. For example, image sensor cell 327 can be from an array of image sensor cells (e.g. array of image sensor cells 221 in FIG. 2). The image sensor cell 327 can include a lens 322, a stacked polarizer 323, and a pixel 326. Lens 322 can be configured to direct and focus a light source onto a photo diode portion of pixel 326. Stacked polarizer 323 can include a first polarizer 324-1, a second polarizer 324-2, a third polarizer 324-3, and a fourth polarizer 324-4. First polarizer 324-1, second polarizer 324-2, third polarizer 324-3, and fourth polarizer 324-4 can be coupled to controller 310 and can be configured to receive signals from controller 310 to activate and deactivate the polarizers. First polarizer 324-1, second polarizer 324-2, third polarizer 324-3, and fourth polarizer 324-4 can be wire polarizers that are configured in a stack. The stack can include a lower surface of first polarizer 324-1 above and adjacent to an upper surface of pixel 326, a lower surface of second polarizer 324-2 above and adjacent to an upper surface of first polarizer 324-1, a lower surface of third polarizer 324-43 above and adjacent to an upper surface of second polarizer 324-2, a lower surface of fourth polarizer 324-4 above and adjacent to an upper surface of third polarizer 324-3, and/or a lower surface of lens 322 above and adjacent to an upper surface of fourth polarizer 324-4.

In a number of embodiments, controller 310 can send a signal or signals to individually activate and/or deactivate the first, second, third, and fourth polarizers. For example, the first polarizer 324-1 can be activated and the second, third, and fourth polarizer 324-2, 324-3, and 324-4 can be deactivated. A light source can pass through the activated first polarizer 324-1 and deactivated second, third, and fourth polarizers 324-2, 324-3, and 324-4 and the first polarizer 324-1 can polarize the light source and the pixel 326 can detect the light source and generate image data representing the light source. The image data representing the light source can be sent to the controller 310 for further processing, such as analyzing the quality of the image data, and then can be sent to a memory device (e.g., memory 104 in FIG. 1) to store bits representing the image data. In a number of embodiments, the first, second, third, and fourth polarizers 324-1 324-2, 324-3, and 324-4 can be deactivated, and pixel 326 can detect the light source and generate unpolarized image data.

Figure 4:
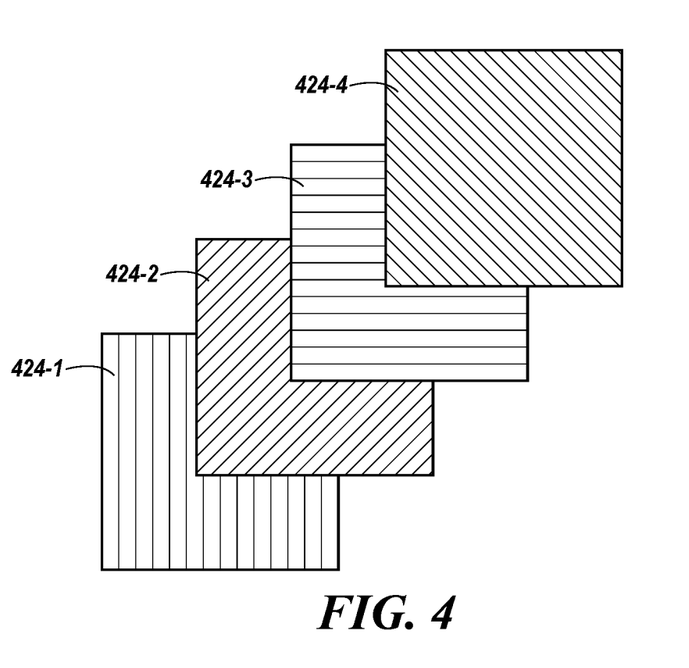
FIG. 4 is a functional block diagram of a stacked polarizer in accordance with a number of embodiments of the present disclosure.

FIG. 4 is a functional block diagram of a stacked polarizer in accordance with a number of embodiments of the present disclosure. Stacked polarizer 423 can include a first polarizer 424-1, a second polarizer 424-2, a third polarizer 424-3, and a fourth polarizer 424-4. First polarizer 424-1 can be configured to polarize light sources at a 0° angle of incidence, second polarizer 424-2 can be configured to polarize light sources at a 45° angle of incidence, third polarizer 424-3 can be configured to polarize light at a 90° angle of incidence, and fourth polarizer 424-4 can be configured to polarize light at a 135° angle of incidence. Stacked polarizer can include any number of polarizers that can be configured to polarize light sources at any angle. Stacked polarizer 423 can include a number of polarizers that are coupled to a controller to individually activate and deactivate the number of polarizers. In a number of embodiments, a stacked polarizer can include any number of polarizers. For example, a stacked polarizer could include 2 polarizers or 5 polarizers, among any other number of polarizers. Also, the polarizers can be configured to polarize light at any degree and are not limited to 0°, 45°, 90°, and 135°.

Figure 5:
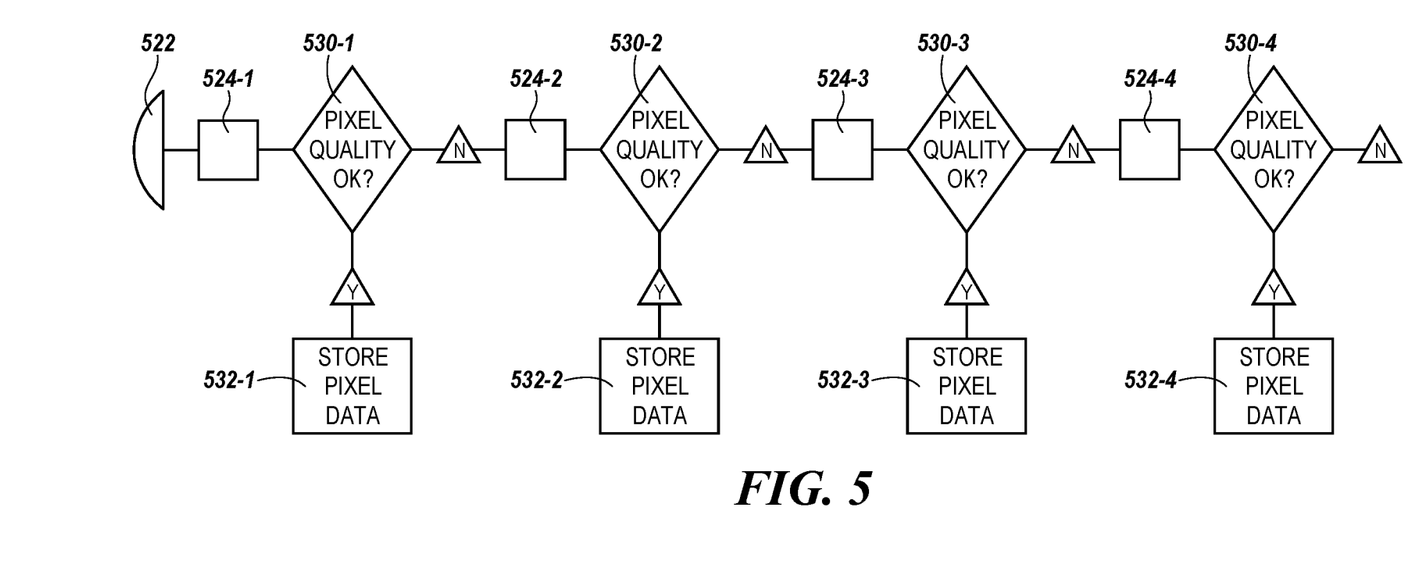
FIG. 5 is flow diagram illustrating an example stacked polarizer imaging process in accordance with a number of embodiments of the present disclosure.

FIG. 5 is flow diagram illustrating an example stacked polarizer imaging process in accordance with a number of embodiments of the present disclosure. In FIG. 5, an image sensor can receive a light source input. The image sensor cells of the image sensor can be used to capture image data to represent the image based on the light source input. The light source input can be passed through lens 522. First polarizer 524-1 can be activated to polarize the light source input and the image sensor cell can generate image data that represents a portion of an image based on the light source input. The image data can be sent to a controller (e.g. controller 110 in FIG. 1 and/or controller 310 in FIG. 3) to determine if the pixel quality is ok 530-1 (e.g., pixel quality meets a threshold). If it is determined that the pixel quality is ok, the pixel data is stored 532-1 in a memory device (e.g., memory device 104 in FIG. 1). If it is determined that the pixel quality is not ok, the pixel data is discarded (e.g., not stored in a memory device. Pixel quality can be based on an intensity of the pixel, which can be measured by a voltage in the image sensor and/or luminance of the display. Pixel quality can also be based on the color gamut, Strehl ratio, among other pixel quality metrics.

Once a determination regarding pixel quality is made for image data polarized with the first polarizer 524-1, second polarizer 524-2 can be activated to polarize the light source input and the image sensor cell can generate image data that represents a portion of an image based on the light source input. The image data can be sent to a controller (e.g. controller 110 in FIG. 1 and/or controller 310 in FIG. 3) to determine if the pixel quality is ok 530-2 (e.g., pixel quality meets a threshold). If it is determined that the pixel quality is ok, the pixel data is stored 532-2 in a memory device (e.g., memory device 104 in FIG. 1). If it is determined that the pixel quality is not ok, the pixel data is discarded (e.g., not stored in a memory device).

Once a determination regarding pixel quality is made for image data polarized with the second polarizer 524-2, third polarizer 524-3 can be activated to polarize the light source input and the image sensor cell can generate image data that represents a portion of an image based on the light source input. The image data can be sent to a controller (e.g. controller 110 in FIG. 1 and/or controller 310 in FIG. 3) to determine if the pixel quality is ok 530-3 (e.g., pixel quality meets a threshold). If it is determined that the pixel quality is ok, the pixel data is stored 532-3 in a memory device (e.g., memory device 104 in FIG. 1). If it is determined that the pixel quality is not ok, the pixel data is discarded (e.g., not stored in a memory device). If it is determined that the pixel quality if not ok, a controller can be configured to interpolate pixel data based on data from nearby pixels.

Once a determination regarding pixel quality is made for image data polarized with the third polarizer 524-3, fourth polarizer 524-4 can be activated to polarize the light source input and the image sensor cell can generate image data that represents a portion of an image based on the light source input. The image data can be sent to a controller (e.g. controller 110 in FIG. 1 and/or controller 310 in FIG. 3) to determine if the pixel quality is ok 530-4 (e.g., pixel quality meets a threshold). If it is determined that the pixel quality is ok, the pixel data is stored 532-4 in a memory device (e.g., memory device 104 in FIG. 1). If it is determined that the pixel quality is not ok, the pixel data is discarded (e.g., not stored in a memory device). In a number of embodiments, if it is determined that the pixel quality is not ok, a controller can be configured to interpolate pixel data based on data from nearby pixels.

Figure 6:
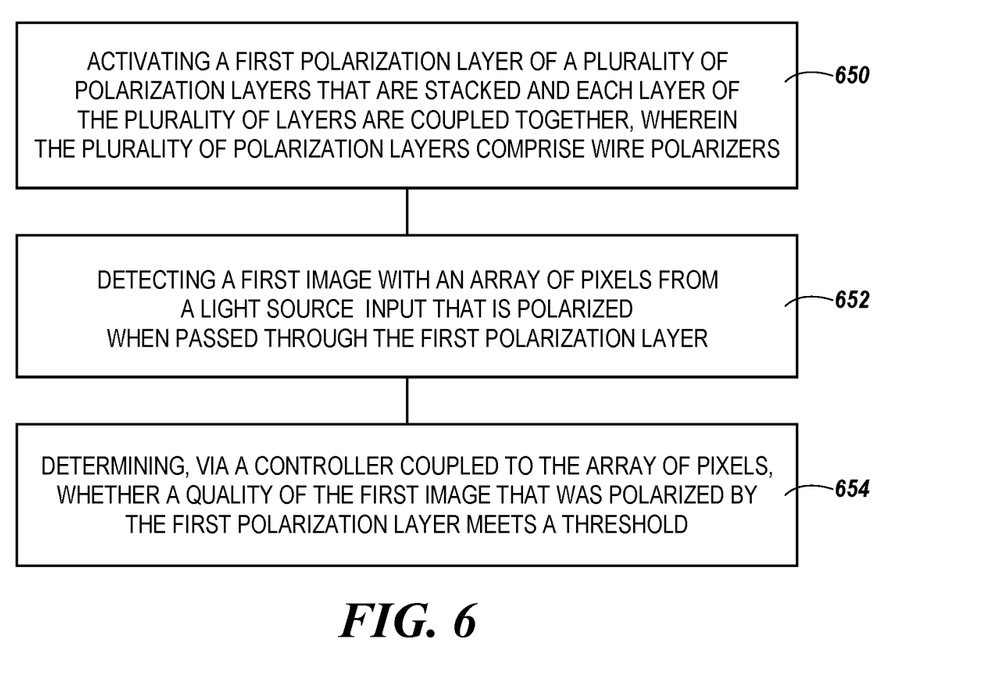
FIG. 6 is flow diagram representing an example method for stacked polarizer imaging in accordance with a number of embodiments of the present disclosure.

FIG. 6 is flow diagram representing an example method for stacked polarizer imaging in accordance with a number of embodiments of the present disclosure. At step 650, the method can include activating a first polarization layer of a plurality of polarization layers that are stacked and each layer of the plurality of polarizations layers are coupled together, wherein the plurality of polarization layers comprise wire polarizers. The first polarization layer can be activated by a number of signals from a controller, while the other polarization layers are deactivated.

At step 652, the method can include detecting a first image with an array of pixels from a light source input that is polarized when passed through the first polarization layer.

At step 654, the method can include determining, via a controller coupled to the array of pixels, whether a quality of the first image that was polarized by the first polarization layer meets a threshold. The controller can be configured to analyze the quality of the first image to determine whether or not to save the image in a memory device. If the first image meets a threshold, the first image can be saved in a memory device. If the first image does not meet a threshold, the first image will be discarded (e.g., not be stored on the memory device). The quality analysis by the controller can also be done on the pixel level, where the quality of each pixel in an array of image sensor cells is analyzed and the pixels the meet the threshold are saved to represent an image, while the pixels that do not meet the threshold are discarded. The discarded pixels can be replaced with pixel data that is interpolated by nearby pixels of the image.

The method can continue for the second polarization layer and can also include activating a second polarization layer of a plurality of polarization layers. The second polarization layer can be activated by a number of signals from a controller, while the other polarization layers are deactivated. The method can include detecting a second image with an array of pixels from a light source input that is polarized when passed through the second polarization layer. The method can include determining, via a controller coupled to the array of pixels, whether a quality of the second image that was polarized by the second polarization layer meets a threshold. The controller can be configured to analyze the quality of the second image to determine whether or not to save the image in a memory device. If the second image meets a threshold, the second image can be saved in a memory device. If the second image does not meet a threshold, the second image can be discarded.

The method can continue for third polarization layer and can also include activating a third polarization layer of a plurality of polarization layers. The third polarization layer can be activated by a number of signals from a controller, while the other polarization layers are deactivated. The method can include detecting a third image with an array of pixels from a light source input that is polarized when passed through the third polarization layer. The method can include determining, via a controller coupled to the array of pixels, whether a quality of the third image that was polarized by the third polarization layer meets a threshold. The controller can be configured to analyze the quality of the third image to determine whether or not to save the image in a memory device. If the third image meets a threshold, the third image can be saved in a memory device. If the third image does not meet a threshold, the third image can be discarded.

The method can continue for fourth polarization layer and can also include activating a fourth polarization layer of a plurality of polarization layers. The fourth polarization layer can be activated by a number of signals from a controller, while the other polarization layers are deactivated. The method can include detecting a fourth image with an array of pixels from a light source input that is polarized when passed through the fourth polarization layer. The method can include determining, via a controller coupled to the array of pixels, whether a quality of the fourth image that was polarized by the fourth polarization layer meets a threshold. The controller can be configured to analyze the quality of the fourth image to determine whether or not to save the image in a memory device. If the fourth image meets a threshold, the fourth image can be saved in a memory device. If the fourth image does not meet a threshold, the fourth image can be discarded.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    activating a first polarization layer of a plurality of polarization layers that are stacked and each layer of the plurality of polarization layers are coupled together, wherein the plurality of polarization layers comprise wire polarizers;
    detecting a first image with an array of pixels from a light source input that is polarized when passed through the first polarization layer; and
    determining, via a controller coupled to the array of pixels, whether a quality of the first image that was polarized by the first polarization layer meets a threshold; and
    wherein the controller analyzes the quality of the first image by measuring voltages of the array of pixels to determine intensity of the array of pixels; and
    saving the first image to a memory device in response to the quality of the first image meeting the threshold.

2. The method of claim 1, further including deactivating the first polarization layer and activating a second polarization layer of the plurality of polarization layers.

3. The method of claim 2, further including detecting a second image with the array of pixels from the light source input that is polarized when passed through the second polarization layer.

4. The method of claim 3, further including determining, via the controller coupled to the array pixels, whether a quality of the second image that passed through the second polarization layer meets the threshold.

5. The method of claim 2, further including deactivating the first and second polarization layers and activating a third polarization layer of the plurality of polarization layers.

6. The method of claim 5, further including deactivating the first, second, and third polarization layers and activating a fourth polarization layer of the plurality of polarization layers.

7. An apparatus, comprising:
    an array of image sensor cells, wherein each image sensor cell of the array of image sensor cells includes:
        a first polarization layer, a second polarization layer, a third polarization layer, a fourth polarization layer, wherein the first, second, third, and fourth polarization layers are wire polarizers that form a stack and are coupled to control circuitry; and
        a pixel, wherein each pixel of the array image sensor cells are coupled to the control circuitry and wherein the control circuitry is configured to:
    activate the first polarization layer of each image sensor cell of the array of image sensor cells, while the second, third, and fourth polarization layers of each image sensor cells of the array of image sensor cells are deactivated, and cause the array of image sensor cells to detect a first image polarized with the first polarization layer; and
    utilize a controller to analyze a quality of the first image by measuring voltages of the array of pixels to determine intensity of the array of pixels; and
    save the first image in a memory array in response to the quality of the first image meeting a threshold.

8. The apparatus of claim 7, wherein the control circuitry is configured to activate the second polarization layer of each image sensor cell of the array of image sensor cells, while the first, third, and fourth polarization layers of each image sensor cell of the array of image sensor cells are deactivated, and cause the array of image sensor cells to detect a second image polarized with the second polarization layer.

9. The apparatus of claim 7, wherein the control circuitry is configured to activate the third polarization layer of each image sensor cell of the array of image sensor cells, while the first, second, and fourth polarization layers of each image sensor cell of the array of image sensor cells are deactivated, and cause the array of image sensor cells to detect a third image polarized with the third polarization layer.

10. The apparatus of claim 7, wherein the control circuitry is configured to activate the fourth polarization layer of each image sensor cell of the array of image sensor cells, while the first, second, and third polarization layers of each image sensor cell of the array of image sensor cells are deactivated, and cause the array of image sensor cells to detect a fourth image polarized with the fourth polarization layer.

11. The apparatus of claim 7, wherein the array of image sensor cells includes a first portion of the array configured to detect green image data, a second portion of the array configured to detect red image data, and a third portion of the array configured to detect blue image data.

12. The apparatus of claim 7, wherein the apparatus is configured to detect red green blue (RGB) images.

13. The apparatus of claim 7, wherein the first polarization layer is configured to polarize a light source at a 0° angle of incidence, the second polarization layer is configured to polarize the light source at a 45° angle of incidence, the third polarization layer is configured to polarize the light source at a 90° angle of incidence, and the fourth polarization layer is configured to polarize the light source at a 135° angle of incidence.

14. The apparatus of claim 7, wherein the control circuitry is configured to store image data in the memory array based on light that passed through each of the first, second, third, and fourth polarization layers when activated by the control circuitry.

15. An apparatus, comprising:
a stacked polarizer including a first polarization layer, a second polarization layer, a third polarization layer, and a fourth polarization layer, wherein the first, second, third, and fourth polarization layers are coupled to a controller;
an array of image sensor cells coupled to the controller; and
a memory device coupled to the controller, wherein the controller is configured to:
activate the first polarization layer and cause the array of image sensor cells to detect a first image from a light source input that is polarized when passed through the first polarization layer;
activate the second polarization layer and cause the array of image sensor cells to detect a second image from the light source input that is polarized when passed through the second polarization layer;
activate the third polarization layer and cause the array of image sensor cells to detect a third image from the light source input that is polarized when passed through the third polarization layer; and
activate the fourth polarization layer and cause the array of image sensor cells to detect a fourth image from the light source input that is polarized when passed through the fourth polarization layer; and
utilize the controller to analyze a quality of the first image by measuring voltages of the array of pixels to determine intensity of array pixels; and
save the first image to the memory device in response to the quality of the fist image meeting a threshold.

16. The apparatus of claim 15, wherein the first, second, third, and fourth images are saved in RGB format in the memory device.

17. The apparatus of claim 15, wherein the array of image sensor cells includes a first portion of red pixels, a second portion of green pixels, and a third portion of blue pixels.

18. The apparatus of claim 15, wherein the first polarization layer is configured to polarize a light source at 0°, the second polarization layer is configured to polarize the light source at 45°, the third polarization layer is configured to polarize the light source at 90°, and the fourth polarization layer is configured to polarize the light source at 135°.

19. The apparatus of claim 15, wherein the controller is configured to deactivate the first, second, third, and fourth polarization layers and cause the array of image sensor cells to detect a fifth image from the light source input that is unpolarized when passed through the first, second, third, and fourth polarization layers.

* * * * *